(12) United States Patent
Suzuki

(10) Patent No.: US 7,424,308 B2
(45) Date of Patent: Sep. 9, 2008

(54) MOBILE TERMINAL DEVICE AND ANTENNA SWITCH

(75) Inventor: Tadashige Suzuki, Hokkaido (JP)

(73) Assignee: Kyocera Corporation, Kyoto (JP)

( * ) Notice: Subject to any disclaimer, the term of this patent is extended or adjusted under 35 U.S.C. 154(b) by 417 days.

(21) Appl. No.: 11/256,643

(22) Filed: Oct. 21, 2005

(65) Prior Publication Data
US 2006/0089117 A1 Apr. 27, 2006

(30) Foreign Application Priority Data
Oct. 22, 2004 (JP) .............................. 2004-308093

(51) Int. Cl.
H04B 1/44 (2006.01)
(52) U.S. Cl. ............... 455/552.1; 455/553.1; 455/277.1
(58) Field of Classification Search ........................ None
See application file for complete search history.

(56) References Cited

U.S. PATENT DOCUMENTS

| 5,809,405 | A | 9/1998 | Yamaura | |
|---|---|---|---|---|
| 7,251,499 | B2 * | 7/2007 | Ella et al. ................. | 455/552.1 |
| 2002/0081987 | A1 * | 6/2002 | Yoshida et al. ........... | 455/277.1 |
| 2005/0119025 | A1 * | 6/2005 | Mohindra et al. ........ | 455/552.1 |
| 2005/0266904 | A1 * | 12/2005 | Kitaji et al. .................... | 455/78 |

FOREIGN PATENT DOCUMENTS

| JP | 08-293846 | 11/1996 |
|---|---|---|
| JP | 2002-344560 | 11/2002 |
| JP | 2002-369247 | 12/2002 |
| JP | 2004-032443 | 1/2004 |
| KR | 2003-0017215 | 3/2003 |
| KR | 10-0394931 | 8/2003 |

* cited by examiner

Primary Examiner—Thanh C Le
(74) Attorney, Agent, or Firm—Hogan & Hartson LLP

(57) ABSTRACT

A mobile terminal device having an antenna switch able to efficiently switch connection between reception signals from a plurality of antennas and signal processing circuits of the reception signals is provided. The device is able to communicate by a first data transmission system performing a diversity reception and a second data transmission system not performing the diversity reception. The device includes: a first antenna; a second antenna; an antenna attachable and detachable and detachable portion, to which a third antenna is attached and from which the third antenna is detached; a first wireless circuit for performing communication using the first antenna or the third antenna; a second wireless circuit for performing communication using the second antenna; a third wireless circuit for performing communication using the first antenna or the third antenna; and an antenna switch.

11 Claims, 11 Drawing Sheets

FIG. 4

| | CONTENT OF RECEPTION OPERATIONS | SWITCH CONTROL SIGNAL | | CONTROL SIGNAL | | | |
|---|---|---|---|---|---|---|---|
| | | EXOR_OUT | AND_OUT | SUB_ANTSW | EXT_ANTSW | GPS_SEL | SUB_ANTSW |
| RECEPTION OPERATION 1 | NOT PERFORM DIVERSITY RECEPTION (USE EXTERNAL ANTENNA) | L | L | L | L | L | L |
| RECEPTION OPERATION 2 | PERFORM DIVERSITY RECEPTION (EXTERNAL ANTENNA + SECOND ANTENNA) | L | L | H | L | L | H |
| RECEPTION OPERATION 3 | NOT PERFORM DIVERSITY RECEPTION (USE FIRST ANTENNA) | H | L | L | H | L | L |
| RECEPTION OPERATION 4 | PERFORM DIVERSITY RECEPTION (FIRST ANTENNA + SECOND ANTENNA) | H | L | H | H | L | H |
| RECEPTION OPERATION 5 | GPS MODE (USE EXTERNAL ANTENNA) | H | L | L | L | H | L |
| RECEPTION OPERATION 6 | ADJUSTMENT MODE (CONNECT SUB RECEPTION CIRCUIT AND EXTERNAL ANTENNA) | H | H | H | L | H | H |
| RECEPTION OPERATION 7 | GPS MODE (FIRST ANTENNA) EXTERNAL ANTENNA + FIRST ANTENNA PERFORMING DIVERSITY RECEPTION | L | L | L | H | H | L |

MOBILE TERMINAL DEVICE AND ANTENNA SWITCH

CROSS REFERENCCE TO RELATED APPLICATION

This application incorporates by reference the subject mater of Patent Application No. 2004-308093 filed in Japan on Oct. 22, 2004, on which a priority claim is based under 35 U.S.C. §119(a).

BACKGROUND OF THE INVENTION

1. Field of Invention

The present invention relates to a mobile terminal device or other mobile communication device having a plurality of antennas, and to an antenna switch for switching the connection between a plurality of antennas and a reception circuit in a mobile terminal device or other mobile communication device.

2. Description of the Related Art

For example, as a high speed wireless communication system for mobile terminal devices such as mobile phones, in recent years the code division multiple access (CDMA) 2000 1x-EVDO system (hereinafter abbreviated as the "EVDO system") has been developed. The "EVDO system" is standardized in Standard (Specification) T64 IS-2000 C.G. 0024 "High Rate Packet Data Air Interface Specification" of the Association of Radio Industries and Business (ARIB) and is designed to further raise the data rate in data communication for the CDMA2000 1X system (hereinafter abbreviated as the "1x system").

In the "EVDO system", an uplink communication wireless interface for transmission from a mobile terminal device to a base station uses a quadrature phase shift keying (QPSK) as a modulation scheme and uses a CDMA as the multiplex scheme. Its configuration is substantially equivalent to the "1x system". In the "EVDO system", however, the downlink communication wireless interface for transmission from the base station to the mobile terminal device differs from the "1x system". Namely, for the modulation scheme of downlink communication of the "EVDO system", either of the QPSK, an 8-position quadrature phase shift keying (8 PSK), or a 16-position phase amplitude modulation (16 QAM) is used in response to the reception conditions of the mobile terminal device, while for the multiplex scheme, not CDMA, but the time division multiplex access (TDMA) scheme is used.

In the TDMA scheme, time is divided into a plurality of unit times, each of 1/600 second. A base station communicates with only one mobile terminal device in a divided unit time (time slot) and communicates with a plurality of mobile terminal devices by switching the mobile terminal devices communicated with by time. Therefore, in the unit time, it becomes possible to communicate data for each individual mobile terminal device using the maximum power. Data can be communicated between the mobile terminal devices via the base station at a high speed. In the TDMA scheme, unlike personal digital cellular (PDC) phone and other communication devices, the base station side methodically determines (schedules) the mobile terminal devices that communicates with for each unit time slot.

A variety of improved technologies are being developed for mobile terminal devices of the "EVDO system" described above. For example, Japanese Patent Publication (Kokai) No. 2002-369247-A discloses a technology relating to assignment of unit time slots for efficiently using the transmission ability of the base station, while Japanese Patent Publication (Kokai) No. 2002-344560-A discloses technology optimizing the data error rate and communication speed in a downlink data communication.

Further, Japanese Patent Publication (Kokai) No. 2004-32443-A discloses technology providing a detachable external antenna in addition to an ordinary transmission/reception antenna and switching the ordinary antenna and the external antenna in accordance with the reception conditions for a diversity reception. The "diversity reception" scheme is technology eliminating the influence of phasing and improving the reception conditions. The diversity reception (antenna diversity) selects for example the reception signal of the antenna providing the strongest reception strength among the signals received from a plurality of antennas or sequentially selects reception signals of antennas providing high reception strengths and combines these reception signals (selection/combination to thereby enable a mobile terminal device communicating in a reception environment in which phasing occurs to obtain a reception signal having a high signal strength and receive the reception signal in a preferred state in that environment.

The detachable external antenna disclosed in Japanese Patent Publication (Kokai) No. 2004-32443-A is used for improving the reception enviroment when a mobile terminal device is positioned inside a building and the reception conditions of the wireless signal are bad. In that case, the external antenna is positioned at a location in the building where tho reception environment is good, for example, at a window side. By the user connecting a cable of the external antenna to a corresponding terminal (attachment portion) of the mobile terminal device if required and utilizing the reception signal of the external antenna, the reception conditions of the mobile terminal device are improved.

As described above, in order to realize a diversity reception in a mobile terminal device, sometimes a plurality of antennas are required, for example, at least one additional antenna is provided in addition to the ordinary transmission/reception antenna, while a further antenna becomes necessary for extended functions. For example, as an antenna for extended functions, there is for example an antenna receiving a signal from a global positioning system (GPS) satellite for acquiring positioning information.

In a mobile terminal device provided with a plurality of antennas such as two transmission/reception antennas enabling a diversity reception and a GPS antenna, an antenna switch for efficiently switching the reception signals received from the plurality of antennas and outputting them to the reception circuit, GPS processing circuit, or other later signal processing circuit in accordance with the reception environment, the state of attachment or an external antenna, and so on is demanded. The above example was described with reference to a mobile phone or other mobile terminal device as the mobile communication device, but the same is true for other mobile communication devices having a plurality of antennas for realizing diversity reception and extended functions.

SUMMARY OF THE INVENTION

An object of the present invention is to provide an antenna switch able to efficiently switch the connection between reception signals from a plurality of antennas and signal processing circuits of the reception signals.

Another object of the present invention is to provide a mobile terminal device or other mobile communication device having the above antenna switch.

According to the present invention, there is provided a mobile terminal device able to communicate by a first data transmission system performing a diversity reception and a second data transmission system not performing the diversity reception. The mobile terminal device includes: a first antenna; a second antenna; an antenna attachable and detachable portion, to which a third antenna is attached and from which the third antenna is detached; a first wireless circuit for performing communication using the first antenna or the third antenna; a second wireless circuit for performing communication using the second antenna; a third wireless circuit for performing communication using the first antenna or the third antenna; and an antenna switch.

The antenna switch (a) switches the connection of the first wireless circuit to either the first antenna or the antenna attachable and detachable portion in response to a first control signal changing in a level in accordance with whether the third antenna is attached to or detached from the antenna attachable and detachable portion, (b) switches to connect or to disconnect the second antenna to the second wireless circuit in response to a second control signal changing in a level in accordance with which transmission system of the first transmmision system or the second transmission system is performed for the communication, and (c) switches the connection of the third wireless circuit to either the first antenna or the antenna attachable portion, in response to a third control signal changing in a level in accordance with whether or not a communication using the third wireless circuit is performed.

According to the present invention, there is also provided a mobile terminal device able to communicate by a first data transmission system performing a diversity reception and a second data transmission system not performing the diversity reception.

The mobile terminal device includes: a first antenna; a second antenna; an antenna attachable and detachable portion, to which a third antenna is attached and from which the third antenna is detached; a first wireless circuit for performing communication using the first antenna or the third antenna; a second wireless circuit for performing communication using the second antenna; a third wireless circuit for performing communication using the first antenna or the third antenna; an antenna switch for switching the connection of the first wireless circuit, the second wireless circuit and the third wireless circuit, to either the first antenna, the second antenna or the third antenna, in response a first control signal changing in a level in accordance with whether the third antenna is attached to or detached from the antenna attachable and detachable portion, a second control signal changing in a level in accordance with which transmission system of the first transmission system or the second transmission system is performed for the communication, and a third control signal changing in a level in accordance with whether or not a communication using the third wireless circuit is performed; a first signal generating portion for generating a fourth control signal on the basis of the first control signal and the third control signals; and a second signal generating portion for generating a fifth control signal on the basis of the second control signal and the third control signals.

The antenna switch includes, a first switch for switching the connection of the first wireless circuit to either the first antenna or the antenna attachable and detachable portion in responce to tho fourth control signal, and a second switch for switching the connection of the second wireless circuit to either the second antenna or the antenna attachable and detachable portion in response to the fifth control signal.

According to the present invention, there is further provided an antenna switch for selectively connecting of a first wireless circuit and a second wireless circuit to either a first antenna, a second antenna or a third antenna, including: a first switch having a first antenna terminal connected to the first antenna, a first wireless circuit terminal connected to the first wireless circuit, and a first input/output terminal; and a second switch having a second antenna terminal connected to the second antenna, a second wireless circuit terminal connected to the second wireless circuit, a third antenna terminal connected to the antenna attachable and detachable portion, and a second input/output terminal connected to the first input/output terminal, the first switch switching a status for connecting the first antenna terminal and the first wireless circuit terminal, or a status for connecting the first input/output terminal and the first wireless circuit terminal, in accordance with whether or not the third antenna it attached to the antenna attachable and detachable portion, and the second switch switching a status for connecting the second antenna terminal and the second wireless circuit terminal, and the third antenna terminal and the second input/output terminal, or a status for connecting the second antenna terminal and the second input/output terminal, and the third antenna terminal and the second wireless circuit terminal, in accordance with whether or not the communication using a diversity reception system is performed.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

Figure 1:
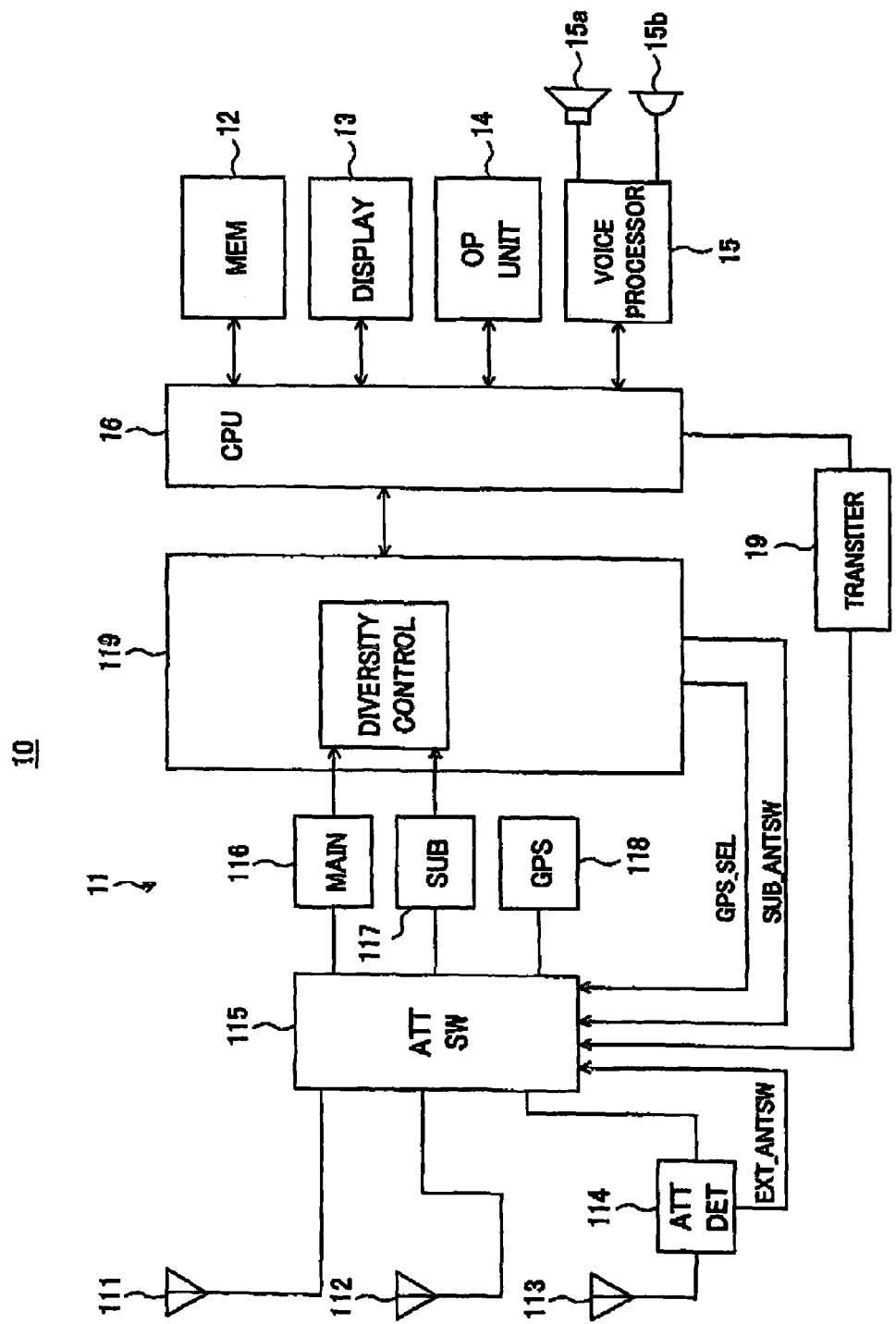
FIG. 1 is a block diagram showing the configuration of a mobile phone according to an embodiment of the present invention.
Figure 2:
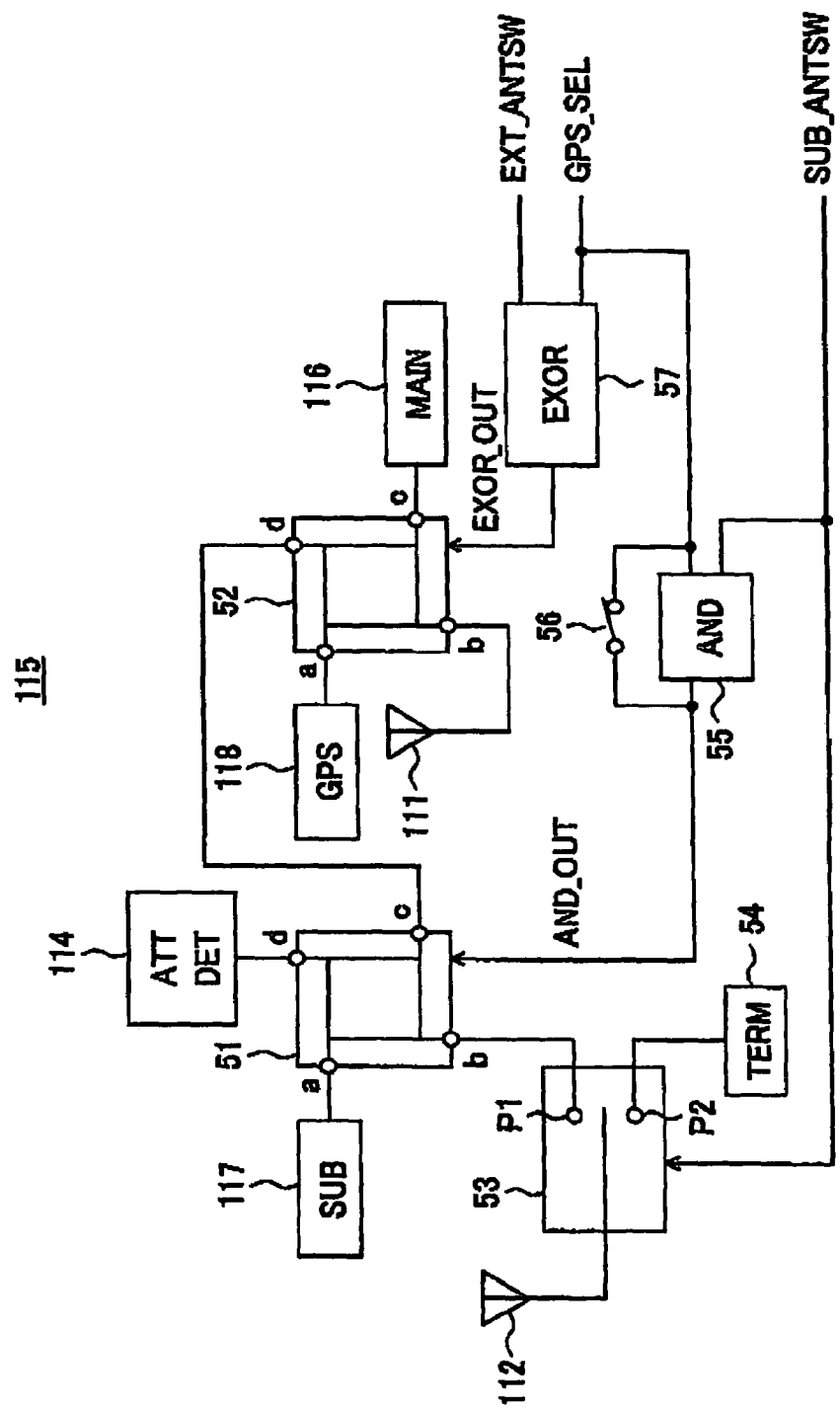
Figure 3A:
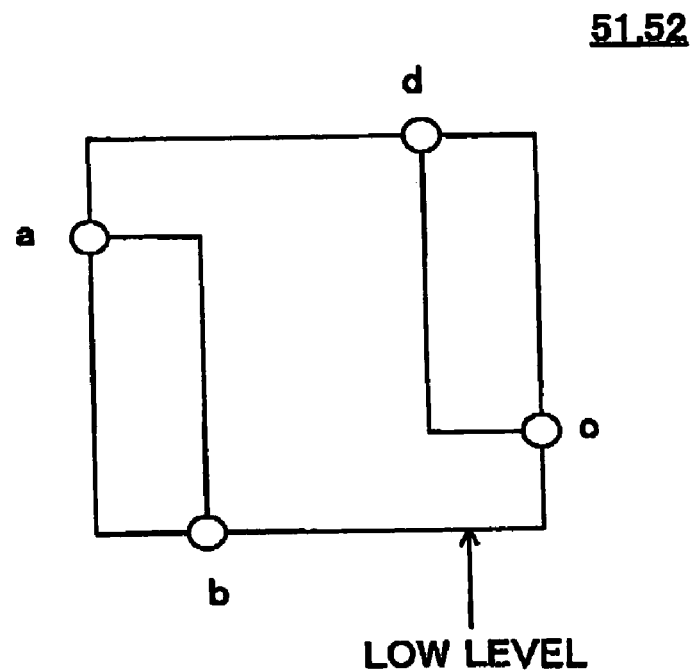
Figure 3B:
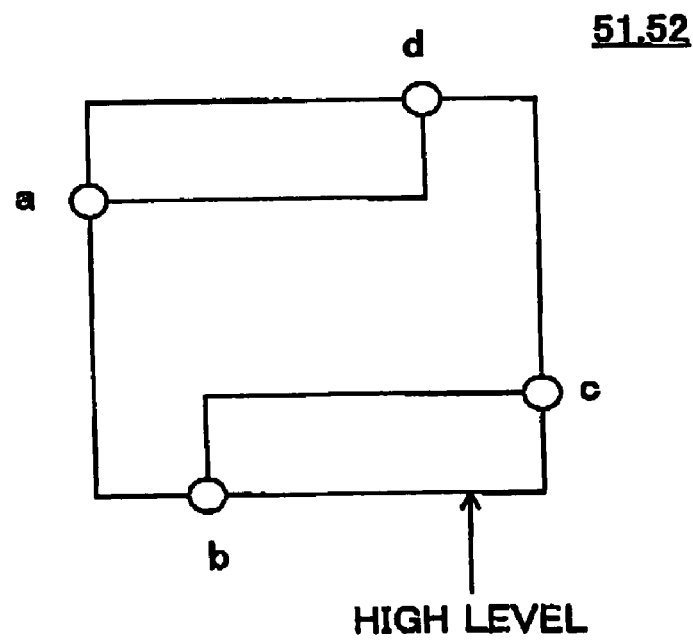

FIG, 2 is a block diagram showing an example of the circuit configuration of an antenna switch shown in FIG. 1;

FIGS. 3A and 3B are diagrams showing switch operations of DPDT switches shown in FIG. 2;

FIG. 4 is a diagram showing relationships between the reception operations and signal levels on an antenna switch, and FIG. 5 to FIG. 11 are equivalent circuit diagrams of an antenna switch during reception operations.

DESCRIPTION OF THE PREFERRED EMBODIMENTS

Below, an embodiment of the present invention will be described with reference to the attached drawings.

A mobile phone 10 according to the present embodiment illustrated in FIG. 1 has a plurality of antennae including an external antenna able to be plugged into an antenna socket, as an example of the an antenna attachable and detachable portion, and a reception system circuit and can selectively communicate by first data transmission system performing a diversity reception (CDMA2000 1xEVDO system, hereinafter, simply referred to as the "EVDO system") and a second data transmission system not performing diversity reception (CDMA2000 1x, hereinafter, simply referred to as the "1x system"). In a standby state of the mobile phone 10, a communication is carried out by the "1x system". When performing the diversity reception, which antenna is to be used as a main antenna and which antenna is to be used as a sub antenna among a plurality of antennas, i.e., three antennae 111, 112, and 113 in the present embodiment, are suitably selected by an antenna switch 115 described later by considering plug-in of the external antenna.

The reception system circuit including the main reception circuit 116, the sub reception circuit 117, and the CPS circuit 118 communicates by only a single antenna when communicating by the "1x system". On the other hand, when communicating by the "EVDO system", it combines signals received by the main antenna and the sub antenna and sets tor the sub antenna a predetermined terminating impedance, for example 50Ω, enabling matching with the frequency band used in communicating by the "EVDO system".

In the present embodiment, the mobile phone 10 is configured as a wireless communication terminal able to be connected to wireless networks (communication networks) of the following two types of transmission on systems.

(1) Usually connected "1x system (IS95)" network (2) "EVDO system" network having a communication rate higher than that in the usually connected wireless network (1), but narrower in the service area In the "EVDO system", based on the information for notifying the reception conditions received from the transmission side wireless communication terminal, the communication rate is changed by switching the modulation scheme of the data transmitted by a not shown base station to this wireless communication terminal. For example, the base station uses a communication rate having a high data error rate (low error durability), but a high speed when the reception conditions of the wireless communication terminal device are good, and uses a communication rate having a lower communication speed but lower data error rate (higher error durability) when the reception conditions of the wireless communication terminal during are bad. As a result, it becomes possible to communicate data by using a communication rate in accordance with the reception conditions.

In the "EVDO system", a communication in the downlink direction from a base station to a wireless communication terminal device is performed by TDMA in which time is divided into a time unit of 1/600 second, the base station communicates with only one mobile communication terminal device in each unit time (unit time slot), and the station communicates with a plurality of mobile communication terminal devices by switching the mobile communication terminal device communicated with for each unit time. Due to this, in the unit time slot, it becomes possible to constantly transmit data to the individual wireless communication terminal devices with the maximum power, and mobile communication terminal devices can communicate with each other via a base station at the highest communication rate.

Further, the mobile phone 10 according to the present embodiment has a GPS function of receiving a signal from a GPS satellite and calculating positioning information based on the received signal. When communicating by the "1x system" or the "EVDO system" and receiving a signal from the GPS satellite, the mobile phone 10 according to the present embodiment uses the reception signal as an interruption signal and interrupts the communication processing of the "1x system" or the "EVDO system" with priority. For example, when the mobile phone 10 in running an application in the CPU 16 that measures the latitude/longitude by receiving the GPS signal and uses this information to display a map on a display unit 13 of the mobile phone 10, it receives the signal from the GPS satellite intermittently (periodically) every predetermined time. When this reception timing arrives, the CPU 16 issues an instruction to the baseband unit 119 and switches the reception conditions of the "1x system" or "EVDO system" to the reception conditions of the GPS signal in the baseband unit 119.

FIG. 1 is a block diagram of the configuration of a mobile phone 10 constituting a mobile terminal device according to an embodiment of the present invention.

The mobile phone 10 according to the present embodiment has a wireless communication unit 11, a memory 12, a display unit 13, an operation unit 14, a voice processing unit 15 including a speaker 15a and a microphone 15b, and a CPU 16.

The wireless communication unit 11 has a first antenna 111, a second antenna 112, an external antenna 113, an antenna socket (not illustrated) to which the external antenna 113 is plugged in, an antenna plug-in detection unit 114 provided in the antenna socket and detecting the plugged-in state of the third antenna, an antenna switch 115, a main reception circuit 116, a sub reception circuit 117, a GPS processing circuit 118, and a baseband signal processing unit 119. A concrete example of the antenna socket and the plug-in detection unit 114, which are an example of an antenna attachable and detachable portion of the present invention, will be described later. The external antenna 113 is an embodiment of the third antenna of the present invention. The main reception circuit 116 is an embodiment of the first wireless circuit of the present invention. The sub reception circuit 117 is an embodiment of the second wireless circuit of the present invention. The GPS processing circuit 116 is an embodiment of the third wireless circuit of the present invention.

An external antenna detection and/or selection control signal EXT_ANTSW output from the antenna plug-in detection unit 114 is an embodiment of the first control signal of the present invention. A sub antenna selection control signal SUB_ANTSW output from the baseband signal processing unit 119 is an embodiment of the second control signal of the present invention. A GPB antenna selection control signal GPS_ANTSEL output from the baseband signal processing unit 119 is an embodiment of the third control signal of the present invention. An exclusive logical OR (EXOR) output signal EXOR_OUT shown in FIG. 2 is an embodiment of the fourth control signal of the present invention. A logical AND (AND) output signal AND_OUT shown in FIG. 2 is an embodiment of the fifth control signal of the present invention.

The wireless communication unit 11 wirelessly communicates utilizing signals by modulating various information such as image data, voice information, and e-mail processed in the CPU 16 and transmitting the same through the transmission/reception antennas 111 and 112 to a not shown base station. Further, the wireless communication unit 11 receives the image data, voice information, e-mail, etc. transmitted from the base station via the transmission/reception antennas 111 and 112, demodulates the received information, and outputs the same to the CPU 16.

Note that when transmitting data from the mobile phone 10 to the base station, the signal from the transmission circuit 19 is output via the antenna switch 115 from for example the first antenna 111.

The first antenna 111 and the second antenna 112 are for example transmission/reception antennas built in the mobile phone 10. The first antenna 111 and the second antenna 112 are antennas which become the main antenna and the sub antenna, or vice versa, when performing an ordinary diversity reception without using the external antenna 13. The antenna characteristics of the first antenna 111 and the second antenna 112, for example, the antenna lengths, are the same.

The external antenna 113 is a transmission/reception antenna which can be plugged into the mobile phone 10 for Use in order to improve the reception environment when the mobile phone 10 is located in an enviroment (a position)

where the reception conditions are not good, for example, inside a building. For example, by the utter placing the external antenna 113 at a location inside the building where the reception environment is good, for example, at a window of the building, and by attaching a cable from the external antenna 113 to the antenna socket of the mobile phone 10 provided with the antenna plug in detection unit 114, for example, a corresponding terminal, and using the reception signal of the external antenna 113 if required, the reception conditions of the mobile terminal device 10 can be improved. In the mobile phone 10 according to the present embodiment, when plugging the external antenna 113 into the antenna socket, the antenna plug-in detection unit 114 detects the plug-in, and the antenna switch 115 selects the external antenna 113 as the main antenna and uses it for the diversity reception etc.

Giving a specific example, the external antenna 113 is plugged into the antenna socket of the mobile phone 10. The antenna socket 10 has for example a jack having a switch contact into which a plug connected to the external antenna 113 is inserted. This jack, constituting an example of the antenna socket, is provided with the antenna plug-in detection unit 114 constituted by a spring switch contact which is pressed to be opened (or closed) for example when the plug connected to the external antenna 113 is inserted. For example, when the attached plug on the front end of the cable connected to the external antenna 113 is inserted into the antenna socket constituted by the jack, the signal received from the external antenna 113 via the jack is supplied to the antenna switch 115. When the plug is inserted into the jack, the antenna plug-in detection unit 114 constituted by the spring switch contact becomes open (or closed), and the spring switch contact generates the external antenna detection and/or selection control signal EXT_ANTSW indicating that the external antenna 113 is plugged into the antenna socket. For example, the external antenna detection and/or selection control signal EXT_ANTSW becomes, a high (H) level in a state where the external antenna 113 is not plugged into the antenna socket, while becomes a low (L) level in a state where the external antenna 113 is plugged into the antenna socket. The external antenna detection and/or selection control signal EXT_ANTSW becomes the control signal of the selection of the antenna in the antenna switch 115 as will be described later.

The antenna switch 115 is a switch for switching the connection of each of the three antennas of the first antenna 111, the second antenna 112, and the external antenna 113 plugged into the antenna socket provided with the antenna plug-in detection unit 114 with the main reception circuit 116, the sub reception circuit 117, and the GPS processing circuit 118. In the antenna switch 115, the selection state of the above three antennas is controlled by the external antenna detection and/or selection control signal EXT_ANTSW from the antenna plug-in detection unit 114, the GPS antenna selection control signal GPS_ANTSEL from tho baseband unit 119, and the sub antenna selection control signal SUB_ANTSW. The configuration and operation of the antenna switch 115 will be described in detail later.

Each of the main reception circuit 116 and the sub reception circuit 117 converts a high frequency reception signal received from a not shown base station and input via the antenna switch 115 to a frequency signal of the baseband width and further demodulates the same from a reception signal of the baseband width to a multiplex signal by a demodulation scheme corresponding to the modulation scheme, for example, one of the three types of demodulation schemes of QPSK, 8 PSK, and 16 QAM.

The GPS processing circuit 118 acquires signal propagation times and orbital information of a plurality of GPS satellites from signals received from the plurality of GPS satellites, for example, three GPS satellites, determines the distances from the GPS satellites and positions of the GPS satellites based on the information, and thereby orientates its own mobile phone 10.

The baseband signal processing unit 119 has a digital circuit for processing the reception data demodulated at the main reception circuit 116 and the sub reception circuit 117 and is configured by for example a digital signal processor (DSP) performing signal processing at a high speed as a "one chip set" as the digital circuit for processing the reception data.

The baseband signal processing unit 119 receives as input the reception data demodulated at the main reception circuit 116 and the sub reception circuit 117 and performs decoding by a not shown decoder, for example, performs spectral despreading of the spectral spread reception multiplex signal. Whether or not the baseband signal processing unit 119 performs the diversity reception is controlled by the CPU 16. When performing the ordinary diversity reception, the baseband signal processing unit 119 combines the reception signals obtained from the main reception circuit 116 and the sub reception circuit 117 by for example the maximum ratio combining method or the minimum mean square error method to make up for deterioration of the reception performance in for example a phasing environment. Here, when there is a reception data assigned to the mobile phone 10 (for example, a speech signal from the other party and the data desired to be downloaded), the reception data is output from a not shown decoder in the baseband signal processing unit 119 to the CPU 16.

The baseband signal processing unit 119 generates two control signals tor controlling the antenna switch 115, that is, the sub antenna selection control signal SUB_ANTSW and the GPS antenna selection control signal GPS_ANTSEL.

The GPS antenna selection control signal GPS_ANTSEL changes in signal level in accordance with whether the mode is the GPS mode or the CDMA mode. The GPS mode is a mode for receiving signals from tht GPS satellites, while the CDMA mode is a mode for speech between the mobile phones via the base station and communication of data with the base station. The CDMA mode includes both of the "1x system (without diversity)" and the "EVDO system (with diversity)". The CPS antenna selection control signal CPS_ANTSEL for example becomes the H level in the GPS mode and becomes the L level in the CDMA mode.

The sub antenna selection control signal SUB_ANTSW is a signal for controlling the selection of the sub antenna at the time of the diversity reception. The sub antenna selection control signal SUB_ANTSW is a control signal for controlling the antenna switch 115 in order to perform the predetermined impedance processing (terminating) for the end of the second antenna 112 when the diversity reception is not carried out and changes in level in accordance with whether or not the diversity reception is carried out. The sub antenna selection control signal SUB_ANTSW tor example becomes the H level when the diversity reception is carried out (when the "EVDO system" is selected) and becomes the L level when the diversity reception is not carried out (when the "1x system" is selected).

The memory 12 includes an EEPROM or other nonvolatile memory and stores in advance a variety of data required for the processing of the CPU 16.

The display unit 13 has a display such as a liquid crystal display (LCD) or organic EL (electroluminescent) device and displays telephone numbers, various messages, text data, etc.

input for the speech function to the user under the control of the CPU 16. Further, the display unit 13 displays a cursor (frame or arrow) for instructing the updating of the screen (request of next page, search start button, etc.) in a plurality or display formats when performing web display etc. in the display unit 13 under the control of the CPU 16.

The operation unit 14 has a speech and (hang up)/power key, start (calling) key, a plurality of tenkeys corresponding to numbers, etc. By the operation of these keys, the input information from the user in supplied to the CPU 16.

The voice processing unit 15 has a not shown voice processing circuit to which the speaker 15*a* for voice output and the microphone 15*b* for voice input are connected for the speech function. The voice processing unit 15 performs predetermined processing with respect to the voice picked up by the microphone 15*b* and outputs the result to the CPU 16 in the wireless communication mode. The voice processing unit 15 performs predetermined processing with respect to the voice information supplied from the CPU 16 and makes the speaker 15*a* output sound.

The CPU 16 performs the overall control of the mobile phone 10 including transmission processing, details of which are not described in the present specification other than the determination of whether or not the diversity reception is to be carried out. For example, the CPU 16 controls the wireless transmission/reception of various information in the wireless communication unit 11, the processing of the voice information in the voice processing unit 15, the display of information in the display unit 13, the change of the display format of the cursor, the start-up of the display unit 13 etc., processing in accordance with the input information of the operation unit 14, access to the memory 12, and so on.

The configuration of the antenna switch 115 will be described next with reference to FIG. 2.

As shown in FIG. 1, the antenna switch 115 is a switch for connecting the three input lines from the three antennas 111, 112, and 113 to three output lines to the main reception unit 116, the sub reception unit 117, and the GPS processing unit 118. Therefore, for example, when three antenna selection control signal lines are supplied from the baseband signal processing unit 119, it is possible to control the switch to switch the antennas according to the designation. However, in order to avoid noise entering the baseband signal processing unit 119 including a digital circuit constituted by the DSP, desirably the antenna switch 115 is arranged on the circuit board at a position away from the baseband signal processing unit 119. For this reason, laying many control lines on the circuit board is not desirable from the viewpoints of the circuit scale and necessity of noise countermeasures.

Accordingly, the antenna switch 115 according to the present embodiment is characterized in that there are control signals from the baseband signal processing unit 119 to the antenna switch 115, that is, the sub antenna selection control signal SUB_ANTSW and the GPS antenna selection control signal GPS_ANTSEL and in that one control signal, that is, the external antenna detection and/or selection control signal EXT_ANTSW, is received from the antenna plug-in detection unit 114 located at a position on the substrate near the antenna switch 115. At that time, by linking the control signals from the baseband signal processing unit 119, that is, the sub antenna selection control signal SUB_ANTSW and the GPS antenna selection control signal GPS_ANTSEL, to specific functions, the antenna 115 can be made to handle a variety of reception operations of the mobile phone 10.

In FIG. 2, the antenna switch 115 is configured by 2-input and 2-output DPDT (double pole/double throw) switches 51 and 52, a 1-input and 2-output SPDT (single pole/double throw) switch 53, a terminating circuit 54, an AND (logical AND) gate circuit 55, a switch 56, and an exclusive logical OR (EXOR) gate circuit 57. FIG. 2 shows connection configurations of the external antenna detection and/or selection control signal EXT_ANTSW from the antenna plug-in detection unit 114 and the sub antenna selection control signal SUB_ANTSW and the GPS antenna selection control signal GPS_ANTSEL from the baseband signal processing unit 119 and the connection configurations of the first antenna 111, the second antenna 112, the antenna plug-in detection unit 114, the main reception circuit 116, the sub reception circuit 117, and the GPS processing circuit 118.

The second DPDT switch 52 is an embodiment of a first switch of the present invention. The first DPDT switch 51 is an embodiment or a second switch of the present invention. The SPDT (third) switch 53 is an embodiment of a third switch or the present invention. The fourth switch 56 is an embodiment of a fourth switch of the present invention. The EXOR gate circuit 57 is an embodiment of a first generating portion of the present invention. The AND gate circuit 55 is an embodiment of a second generating portion of the present invention.

The AND gate circuit 55 obtains the AND logic of the sub antenna selection control signal SUB_ANTSW and the GPS antenna selection control signal GPS_ANTSEL and outputs a logical AND (AND) output signal AND_OUT. The EXOR gate circuit 57 obtains the exclusive OR Logic of the GPS antenna selection control signal GPS_ANTSEL and the external antenna detection and/or selection control signal EXT_ANTSW and outputs an EXOR output signal EXOR_OUT. The DPDT switch 51 is controlled by the AND output signal AND_OUT of the AND gate circuit 55, the second DPDT switch 52 is controlled by the EXOR output signal EXOR_OUT of the EXOR gate circuit 57, and the SPDT switch 53 is controlled by the sub antenna selection control signal SUB_ANTSW.

FIG. 3A and FIG. 3B are diagrams showing the switch operations of the DPDT switches 51 and 52, in which FIG. 3A shows the time when the EXOR output signal EXOR_OUT or the AND output signal AND_OUT is the L level input, and FIG. 3B shows the time when the EXOR output signal EXOR_OUT or the AND output signal AND_OUT is the H level input. Among the four terminals a to d of the DCDT switches 51 and 52, when the EXOR output signal EXOR OUT or the AND output signal AND OUT is the L level input, the terminal a and the terminal b are connected and the terminal a and the terminal d are connected, while when it is the H level input, the terminal a and the terminal d are connected and the terminal b and the terminal c are connected.

The SPDT switch 53 connects the second antenna 112 to the contact P1 shown in FIG. 2 at the time of input of the external antenna detection and/or selection control signal EXT_ANTSW of the H level, while connects the second antenna 112 with the contact P2 shown in FIG. 2 at the time of input of the L level.

The terminating circuit 54 is configured by for example a series-circuit of an inductor and a capacitor (LC series-circuit). When the mobile phone 10 performs the diversity reception, that is, at the time of reception of the mobile phone 10 by the "EVDO system", for example, the second antenna 112 is connected to the sub reception circuit 117, while when it does not perform the diversity reception, that is, at the time of reception of the mobile phone 10 by the "1x system", the second antenna 112 is connected to the terminating circuit 54. In this way, by changing the impedance of the antenna with respect to the impedance from the reception circuit at the time of use of the second antenna 112, the resonance frequency of the second antenna 112 can be changed, therefore, at the time of use of the first antenna 111 and at the time of non-use of the second antenna 112, an attenuation of the signal due to absorption by the second antenna 112 can be reduced, and it is possible to accomplish a termination having a high RF performance. Due to the terminating circuit 54, there are the advantages that it becomes possible to make the mobile phone 10 compatible with different communication system such as the "EVDO system" and "1x system" in a small housing and that the deterioration of the RF performance due to two reception processings, that is, the case where the diversity reception is carried out and the case where the diversity reception is not carried out (dual functions are provided), is extremely small.

The switch 56 is always open where it has a GPS function and the AND circuit 55 operates as in the mobile phone 10. In this case, the AND circuit 55 calculates the AND logic between the sub antenna selection control signal SUB_ANTSW and the GPS antenna selection control signal GPS_ANTSEL and outputs the result to the DPDT switch 51. Note that when using the antenna switch 115 for a mobile phone not having a GPS function as well, by closing the switch 56 by the control signal from the baseband signal processing unit 119, the AND circuit 55 can be bypassed and the DPDT switch 51 can be directly controlled by the GPS antenna selection control signal GPS_ANTSEL. Accordingly, the same antenna switch 115 can be used for a mobile phone having a GPS function and a less expensive mobile phone not having a GPS function, therefore it becomes possible to lower the cost of the antenna switch 115.

FIG. 4 is a diagram showing relationships between the reception operation of the mobile phone 10 and the signal levels on the antenna switch 115.

As described before, the external antenna detection and/or selection control signal EXT_ANTSW becomes the H level in the state where the external antenna 113 is not plugged into the antenna socket, while becomes the L level in the state where the external antenna 113 is plugged into the antenna socket. The GPS antenna selection control signal GPS_ANTSEL becomes the H level at the time or the GPS mods, while becomes the L level at the time of the CDMA mode. The sub antenna selection control signal SUB_ANTSW becomes the H level when performing the diversity reception ("EVDO system" is selected), while becomes the L level when not performing the diversity reception (when the "1x system" is selected).

FIG. 5 to FIG. 11 are equivalent circuit diagrams showing antenna selection and/or connection states of the antenna switch 115 in the reception operations 1 to 7 of the mobile phone 10 shown in FIG. 4. FIG. 5 to FIG. 11 show equivalent circuit diagrams considering the connection states of switches of the antenna switch 115 in accordance with the control signals shown in FIG. 4 for the operations 1 to 7 of the mobile phone 10. In FIG. 5 to FIG. 11, bold lines indicate the selected circuits. The above reception operations are executed in the baseband signal processing unit 119 under the control of CPU 16.

Below, a description will be given of the connection states of the antenna switch 115 in the reception operations.

Reception Operation 1

Figure 5:
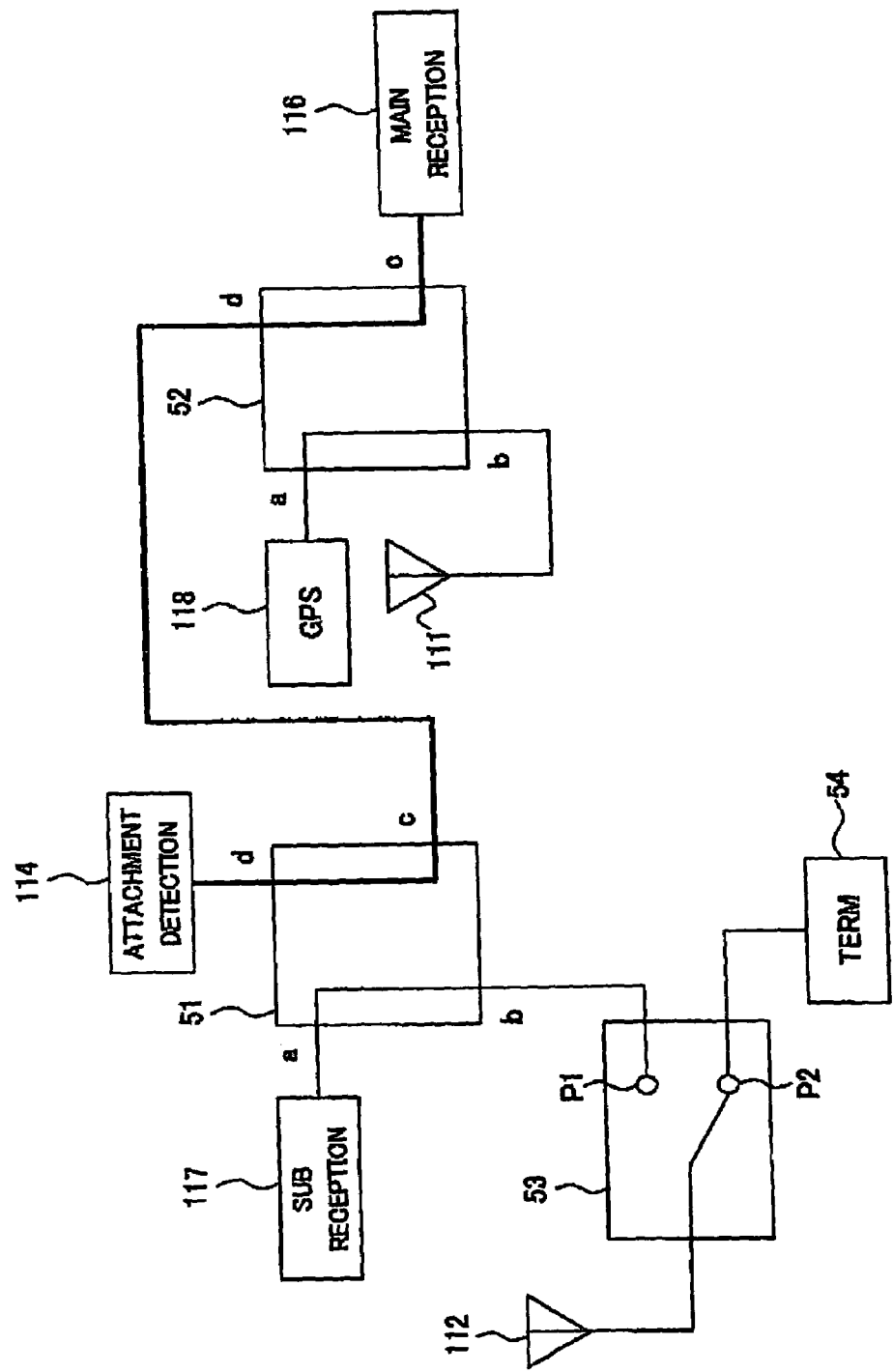

The reception operation 1 is for a case of reception of the "1x system" using the external antenna 113 without the diversity reception. In the reception operation 1, as shown in FIG. 5, the terminal c and the terminal d of the DPDT switch b1 are connected and the terminal c and the terminal c of the DPDT switch 52 are connected, whereby the antenna socket which the external antenna 113 is plugged into and the main reception circuit 116 are electrically connected. The plug-in of the external antenna 113 in the antenna socket is detected by the antenna plug-in detection unit 114, which outputs the external antenna detection and/or selection control signal EXT_ANTSW as the first control signal indicating the valid level. By this, in the wireless communication unit 11, the reception of the "1x system" is carried out using the reception signal of the external antenna 113. The baseband signal processing unit 119 performs processing based on the reception signal of the wireless communication unit 11.

Reception Operation 2

Figure 6:
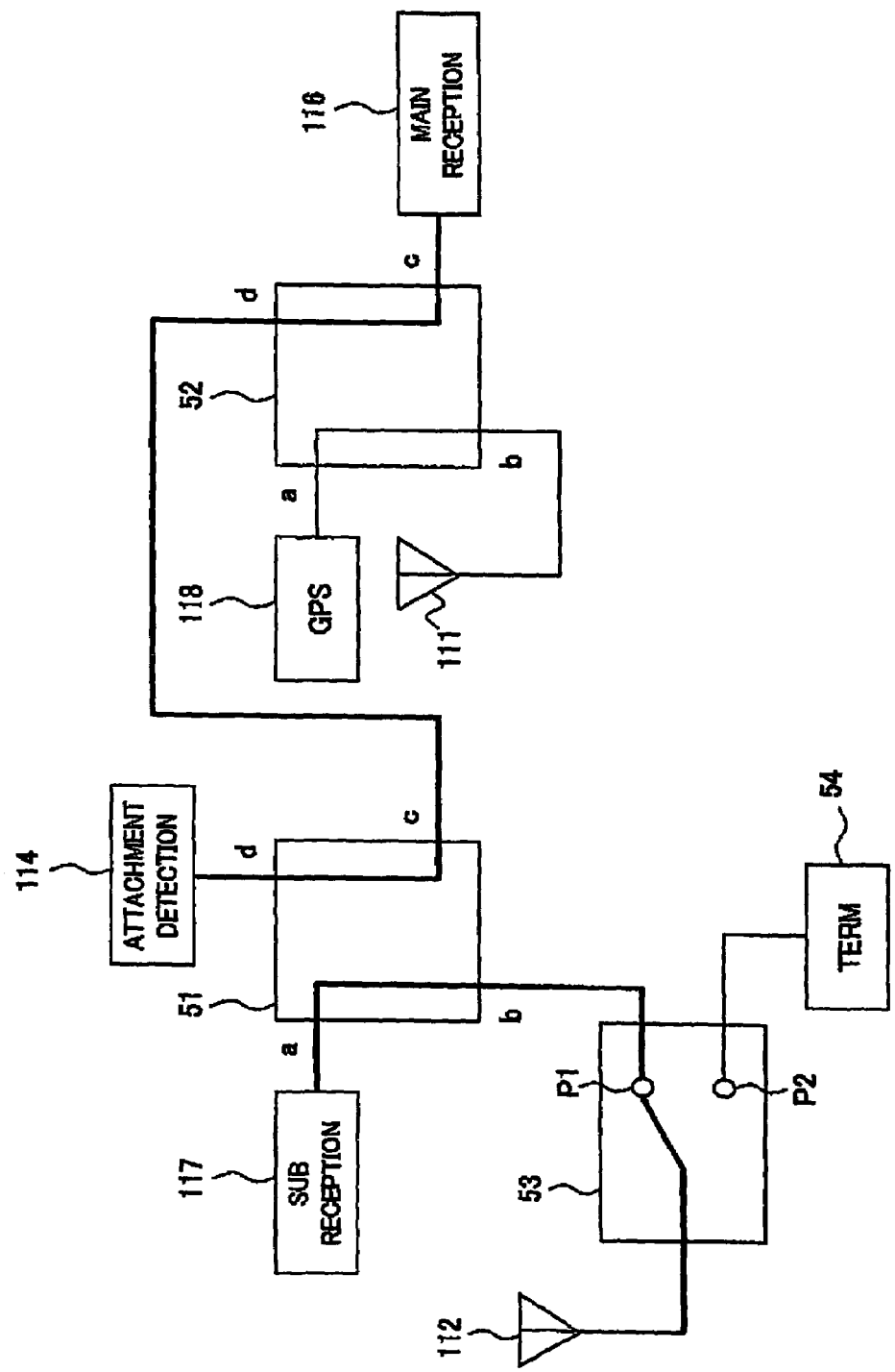
Figure 7:
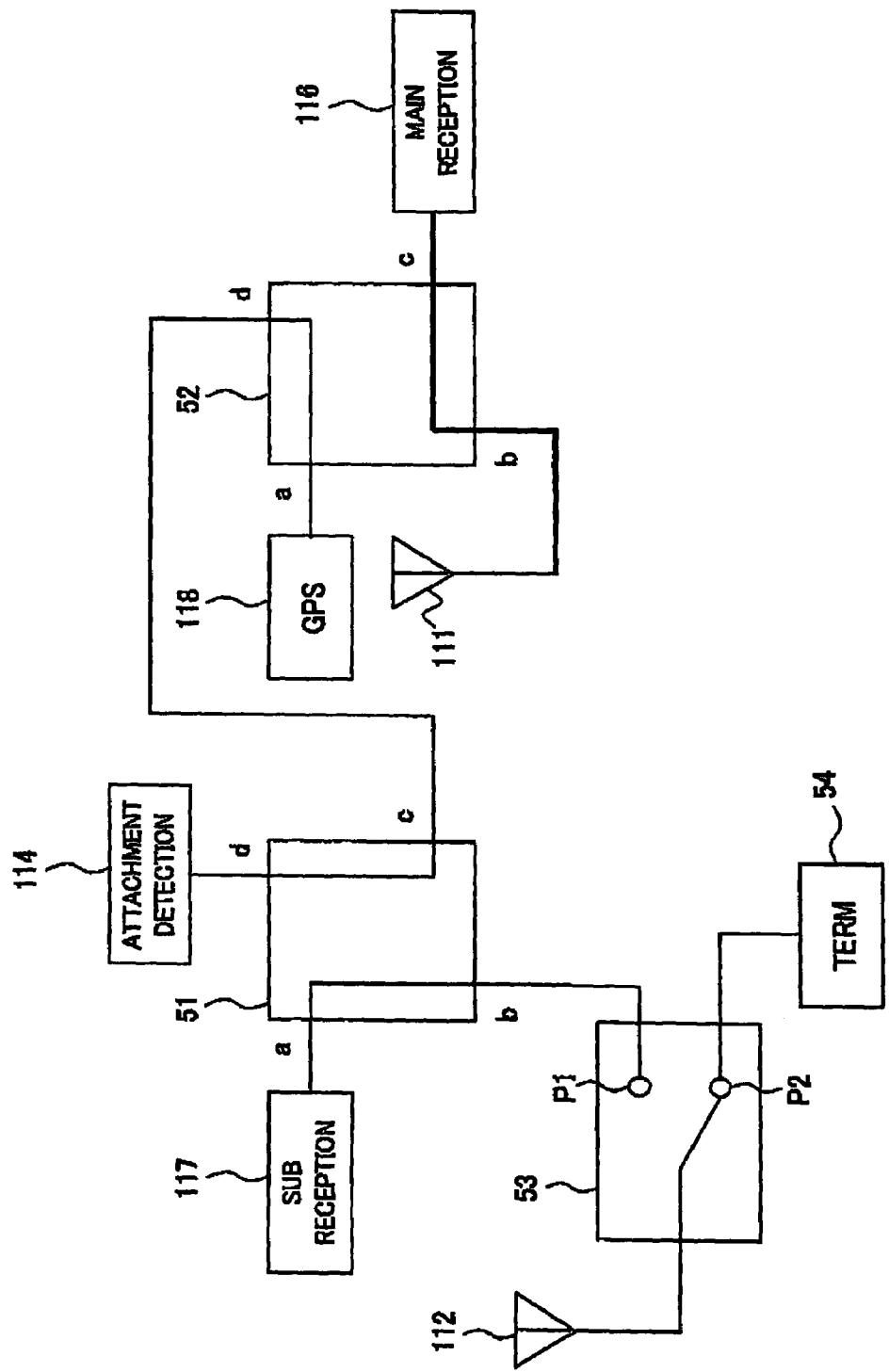

The reception operation 2 is for a case where the external antenna 113 is plugged into the antenna socket and the diversity reception using this external antenna 113 as the main antenna and using the second antenna 112 as the sub antenna is carried out. In the reception operation 2, as shown in FIG. 6, the terminal c and the terminal d of the DPDT switch 51 are connected by the AND output signal AND_OUT and the terminal c and the terminal d of the DPDT switch 52 are connected by the EXOR output signal EXOR_OUT, whereby the antenna socket provided with the antenna plug-in detection unit 114 and the main reception circuit 116 are electrically connected. Further, the terminal a and the terminal b of the PDT switch 51 are connected, and the SPDT switch 53 is connected to the P1 contact, whereby the second antenna 112 and the sub reception circuit 117 are electrically connected. Due to this, the diversity reception using the external antenna 113 as the main antenna and using the second antenna 112 as the sub antenna is carried out. Namely, the baseband signal processing unit 119 performs the diversity reception processing based on the signal of the main reception circuit 116 receiving an input the reception signal of the external antenna 113 and the output signal of the sub reception circuit 117 receiving as input the reception signal of the second antenna 112.

Reception Operation 3

The reception operation 3 is for the case or reception of the "1x system" using the first antenna 111 without the diversity reception. In this case, the external antenna 113 is not plugged into the antenna socket. In the reception operation 3, as shown on FIG. 7, by the connection of the terminal b and the terminal c of the DPDT switch 52, the first antenna 111 and the main reception circuit 116 are electrically connected. As a result, in the wireless communication unit 11, the reception of the "1x system" is carried out by using the reception signal of the first antenna 111. The baseband signal processing unit 119 performs processing based on the reception signal of the wireless communication unit 11.

Reception Operation 4

Figure 8:
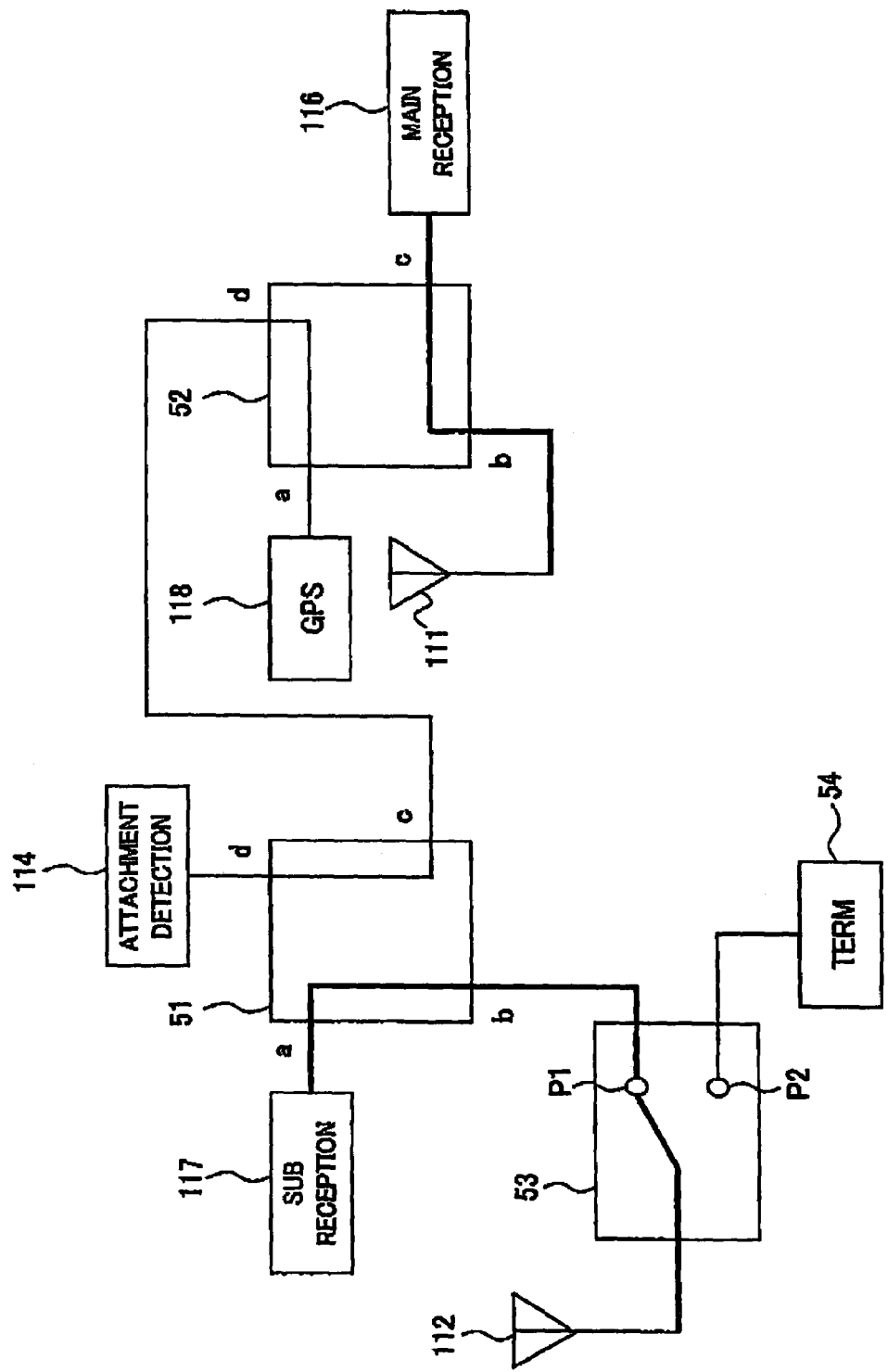

The reception operation 4 is for the case where the diversity reception using the first antenna 111 as the main antenna and using the second antenna 112 as the sub antenna is carried out. In this case, the external antenna 113 Is not plugged into the antenna socket. In the reception operation 3, as shown in FIG. 8, by the connection of the terminal a and the terminal b of the DPDT switch 51, the second antenna 112 and the sub reception circuit 117 are electrically connected. Further, by the connection of the terminal b and the terminal c of the DPDT switch 52, the first antenna 111 and the main reception circuit 116 are electrically connected. As a result, in the wireless communication unit 11, the diversity reception using the first antenna 111 as the main antenna and using the second antenna 112 as the sub antenna is carried out. Namely, the baseband signal processing unit 119 performs the diversity reception processing based on the signal of the main reception circuit 116 receiving as input the reception signal of the first antenna 111 and the output signal of the sub reception circuit 117 receiving as input the reception signal of the second antenna 112.

Reception Operation 5

Figure 9:
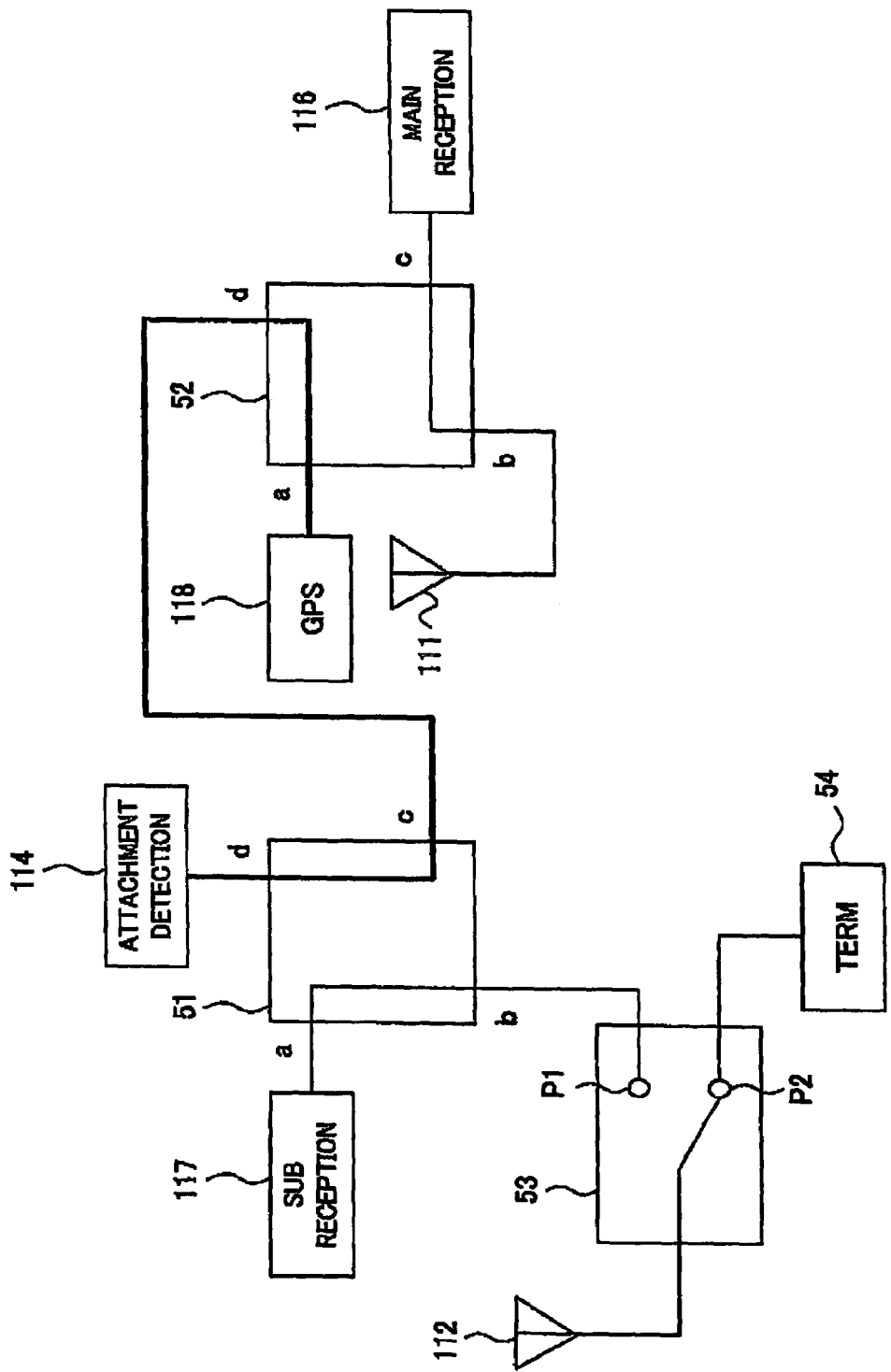

The reception operation 5 is tor the case of reception from GPS satellites using the external antenna 113 (CPS mode). In this case, the external antenna 113 is plugged into the antenna socket. In the reception operation 5, as shown in FIG. 9, by the connection of the terminal c and the terminal d of the DPDT switch 51 and the connection of the terminal a and the terminal d of the DPDT switch 52, the antenna socket provided with the antenna plug-in detection unit 114 and the GPS processing circuit 118 are electrically connected. As a result, in the GPS processing circuit 118, the reception of signals from the CPS satellites is carried out by the external antenna 113. The result is for example displayed by the CPU 16 on the display unit 13.

Reception Operation 6

Figure 10:
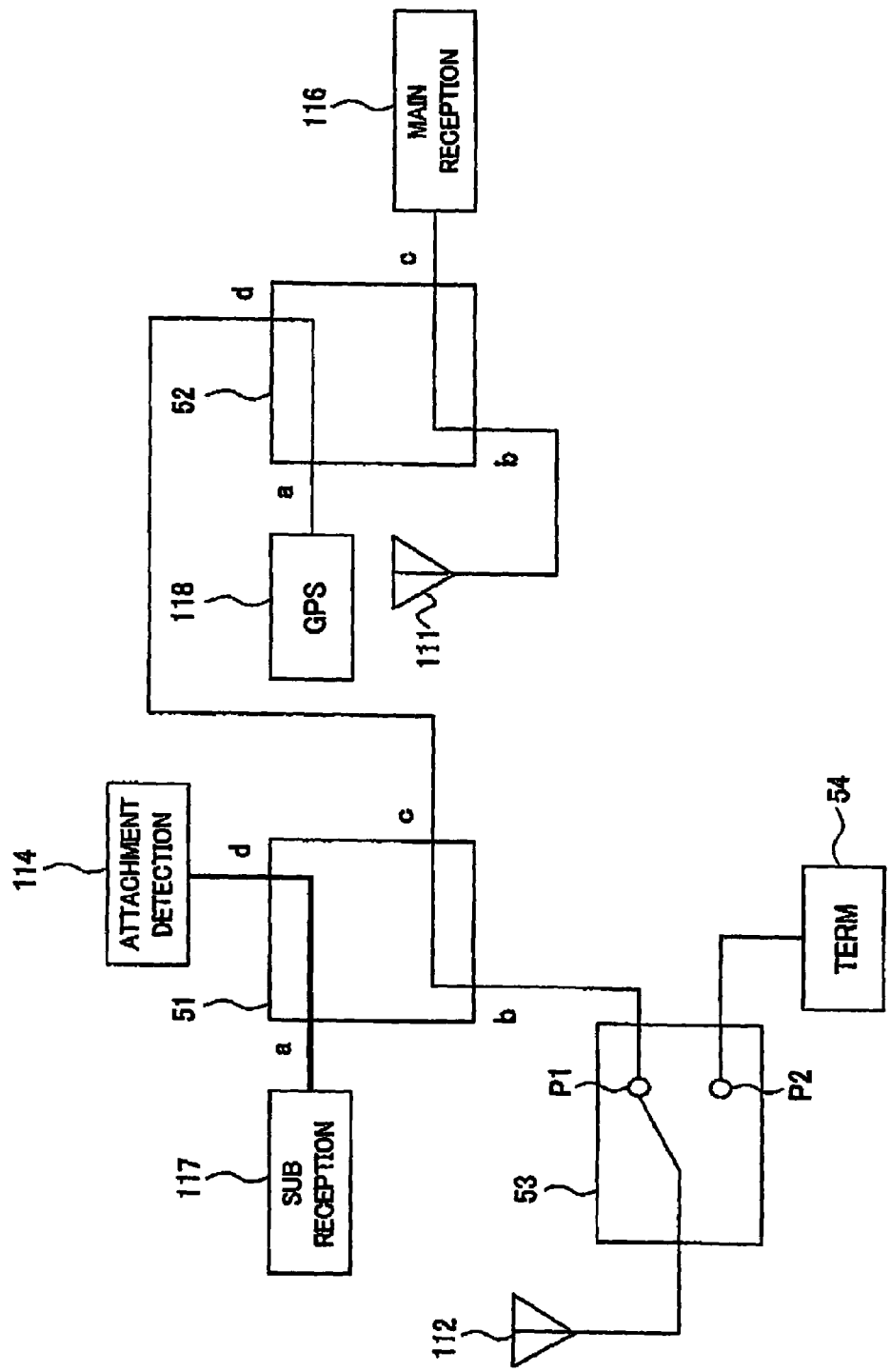

In the reception operation 6, the external antenna 113 and the sub reception circuits 117 are connected, not for any actual application, but for an adjustment mode. In the reception operation 6, as shown in FIG. 10, by the connection of the terminal a and the terminal d of the DPDT switch b1, the antenna socket provided with the antenna plug-in detection unit 114 and the sub reception circuit 117 are electrically connected. As a result, for example, the reception level of the external antenna 113 can be adjusted in the baseband signal processing unit 119.

Reception Operation 7

Figure 11:
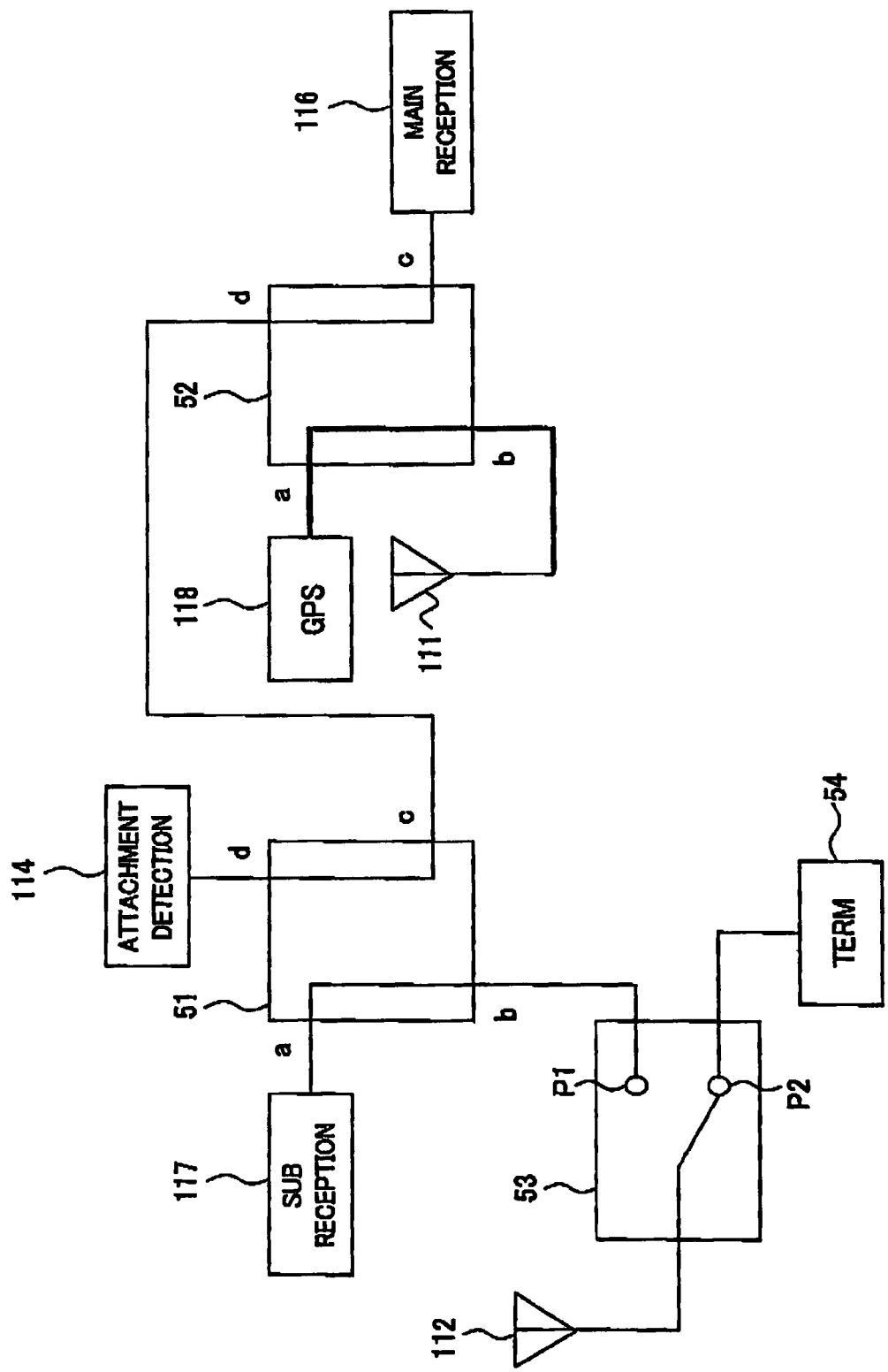

The reception operation 7 in for the case of reception from the CPS satellites using the first antenna 111 (GPS mode). In this case, the external antenna 113 is not plugged into the antenna socket. In the reception operation 7, as shown in FIG. 11, by the connection of the terminal a and the terminal b of the DPDT switch 52, the first antenna 111 and the GPS processing circuit 118 are electrically connected. AS a result, in the wireless communication unit 11, the signals from the GPS satellites are received by the first antenna 111. Due to this, in the GPS processing circuit 118, the signals from the GPS satellites are received out by the first antenna 111. The result is displayed by the CPU 16 on the display unit 13.

As described above, according to the mobile phone 10 according to the present embodiment, there is provided the first antenna 111, the second antenna 112, the antenna socket having the antenna plug-in detection unit 114 and to which the external antenna 113 is plugged in, and the antenna switch 115 for switching the connection of the main reception circuit 116, the sub reception circuit 117, and the GPS processing circuit 118. The antenna switch 115 controls the connection configuration of the antennas by the external antenna detection and/or selection control signal EXT_ANTSW from the antenna plug-in detection unit 114 detecting that the external antenna 113 is plugged into the antenna socket and two control signals from the baseband signal processing unit 119, that is, the sub antenna selection control signal SUB_ANTSW and the GPS antenna selection control signal GPS_ANTSEL.

Accordingly, after satisfying requests with respect to the reception operation of the diversity reception function/GPS function etc., the number of control signal lines with respect to the antenna switch 115 from the baseband signal processing unit 119 can be reduced to two. Namely, it is also possible to perform the switch control by supplying 3 bits of control signals by three signal lines from the baseband signal processing unit 119 to the antenna switch 115, but from the viewpoints of the circuit scale and the necessity of noise countermeasure, it is not desirable to arrange many signal lines. In the mobile phone 10 according to the present embodiment, by supplying one control signal, that is, the external antenna detection and/or selection control signal EXT ANTSW, from the antenna socket having the antenna plug-in detection unit 114 arranged near the antenna switch 115 on the substrate, the number of signal lines from the baseband signal processing unit 119 can be reduced. Concerning the use of the GPS use antenna and the sub antenna, as previously described, the switching is frequently made by the change of the time of switching of the communication system and the application used. Contrary to this, by making only the control line of the external antenna (external antenna detection and/or selection control signal EXT_ANTSW) independent, the distance of the control line from the CPU 16 or the baseband signal processing unit 119 can be shortened.

According to the mobile phone 10 according to the present embodiment, in order to make the DPDT switches 51 and b2 the same structure, the connection circuits including the gate circuits 55 and 57 for processing the control signals were configured as shown in FIG. 2. Due to this, the number of parts of the antenna switch 115 is not increased, and the cost can be lowered.

According to the mobile phone 10 according to the present embodiment, one control signal changing in level in accordance with whether or not the external antenna 113 was plugged in, that is, the external antenna detection and/or selection control signal EXT_ANTSW, was supplied from the antenna plug-in detection unit 114 provided in the antenna socket and, at the came time, a control signal changing in level in accordance with whether or not the mode is the GPS mode, that is, the GPS antenna selection control signal GPS_ANTSEL, and a control signal changing in level in accordance with whether or not the diversity reception was to be carried out, that is, the sub antenna selection control signal SUB_ANTSW, were supplied from the baseband signal processing unit 119. By designing the control signals from the baseband signal processing unit 119 in this way, it becomes possible to control the antenna switch 115 so as to be able to handle a variety of reception operations considering the external antenna 113.

The mobile phone 10 using the "1x system" and the "EVDO system" and providing the GPS function was described as an example of the mobile terminal device of the present invention, but the present invention is not limited to this. The present invention can also be applied to a switch for switching among communication systems performing the same operation, a mobile terminal device or other mobile communication device having such a switch, or an antenna switch used for the same, for example, a personal digital assistant (PDA) etc. provided with a communication module. Accordingly, the present invention is not limited to the above examples.

In the above description, the synthesizing of the two reception signals received at the two antennas is described as an example. Of course, as a present embodiment, the diversity reception system using a reception signal having the most highest strength, among a plurality of the reception signals of a plurality of antennas, can be performed.

It should be understood by those skilled in the art that various modifications, combinations, sub-combinations, and alterations may occur depending on design requirements and other factors insofar as they are within the scope of the appended claims or the equivalents thereof.

The invention claimed is:

1. A mobile terminal device able to communicate by a first data transmission system performing a diversity reception and a second data transmission system not performing the diversity reception, the mobile terminal device comprising:
a first antenna;
a second antenna;
an antenna attachable and detachable portion, to which a third antenna is attached and from which the third antenna is detached;
a first wireless circuit for performing communication using the first antenna or the third antenna;
a second wireless circuit for performing communication using the second antenna;
a third wireless circuit for performing communication using the first antenna or the third antenna; and
an antenna switch,
wherein the antenna switch
switches the connection of the first wireless circuit to either the first antenna or the antenna attachable and detachable portion in response to a first control signal changing in a level in accordance with whether the third antenna is attached to or detached from the antenna attachable and detachable portion,
switches to connect or to disconnect the second antenna to the second wireless circuit in response to a second control signal changing in a level in accordance with which transmission system of the first transmission system or the second transmission system is performed for the communication, and
switches the connection of the third wireless circuit to either the first antenna or the antenna attachable and detachable portion, in response to a third control signal changing in a level in accordance with whether or not the communication using the third wireless circuit is performed.

2. A mobile terminal device as set forth in claim 1, wherein the third antenna is located at a position where a reception condition of the mobile terminal is improved.

3. A mobile terminal device as set forth in claim 1, wherein the antenna switch comprises:
a first switch for switching the connection of the first wireless circuit to either the first antenna or the antenna attachable and detachable portion in response to the first control signal when the communication using the third wireless circuit is not performed, and
a second switch for switching the connection of the second wireless circuit to either the second antenna or the antenna attachable and detachable portion in response to the second control signal when the communication using the third wireless circuit is not performed.

4. A mobile terminal device as set forth in claim 3, wherein the antenna switch further comprises a third switch provided between the second switch and the second antenna, for switching whether or not the second switch and the second antenna is connected in response to the first control signal.

5. A mobile terminal device able to communicate by a first data transmission system performing a diversity reception and a second data transmission system not performing the diversity reception,
the mobile terminal device comprising:
a first antenna;
a second antenna;
an antenna attachable and detachable portion, to which a third antenna is attached and from which the third antenna is detached;
a first wireless circuit for performing communication using the first antenna or the third antenna;
a second wireless circuit for performing communication using the second antenna;
a third wireless circuit for performing communication using the first antenna or the third antenna;
an antenna switch for switching the connection of the first wireless circuit, the second wireless circuit and the third wireless circuit, to either the first antenna, the second antenna or the third antenna, in response a first control signal changing in a level in accordance with whether the third antenna is attached to or detached from the antenna attachable and detachable portion, a second control signal changing in a level in accordance with which transmission system of the first transmission system or the second transmission system is performed for the communication, and a third control signal changing in a level in accordance with whether or not a communication using the third wireless circuit is performed;
a first signal generating portion for generating a fourth control signal on the basis of the first control signal and the third control signals; and
a second signal generating portion for generating a fifth control signal on the basis of the second control signal and the third control signals,
the antenna switch comprising,
a first switch for switching the connection of the first wireless circuit to either the first antenna or the antenna attachable and detachable portion in response to the fourth control signal, and
a second switch for switching the connection of the second wireless circuit to either the second antenna or the antenna attachable and detachable portion in response to the fifth control signal.

6. A mobile terminal device as set forth in claim 5, wherein the antenna switch further comprises a third switch, provided between the second switch and the second antenna, for switching whether or not the second switch and the second antenna is connected in response to the first control signal.

7. A mobile terminal device as set forth in claim 5, wherein the antenna switch comprises a fourth switch, provided in parallel to the second signal generating portion, for switching whether or not the second signal generating portion is to be bypassed, in response to the third control signal.

8. A mobile terminal device as set forth in claim 6, wherein the antenna switch comprises a fourth switch, provided in parallel to the second signal generating portion, for switching whether or not the second signal generating portion is to be bypassed, in response to the third control signal.

9. An antenna switch for selectively connecting of a first wireless circuit and a second wireless circuit to either a first antenna, a second antenna or a third antenna, comprising:
a first switch having a first antenna terminal connected to the first antenna, a first wireless circuit terminal connected to the first wireless circuit, and a first input/output terminal; and
a second switch having a second antenna terminal connected to the second antenna, a second wireless circuit terminal connected to the second wireless circuit, a third antenna terminal connected to an antenna attachable and detachable portion, and a second input/output terminal connected to the first input/output terminal,
the first switch switching a status for connecting the first antenna terminal and the first wireless circuit terminal, or a status for connecting the first input/output terminal and the first wireless circuit terminal, in accordance with whether or not the third antenna is attached to the antenna attachable and detachable portion, and
the second switch switching a status for connecting the second antenna terminal and the second wireless circuit terminal, and the third antenna terminal and the second input/output terminal, or a status for connecting the second antenna terminal and the second input/output terminal, and the third antenna terminal and the second wireless circuit terminal, in accordance with whether or not the communication using a diversity reception system is performed.

10. An antenna switch as set forth in claim 9, further comprising a third switch, provided between the second antenna terminal and the second antenna, for disconnecting the connection of the second antenna terminal and the second antenna in accordance with whether or not the communication using the diversity reception system is performed.

11. An antenna switch as set forth in claim 10, wherein the first switch further has a third wireless circuit terminal, and the first switch switches the connection of either the first wireless circuit terminal or the third wireless circuit terminal to the first input/output terminal, in accordance with whether or not the third wireless circuit is operated when the third antenna is attached to the antenna attachable and detachable portion.

* * * * *